United States Patent
Ims (10) Patent No.: US 6,542,908 B1
(45) Date of Patent: *Apr. 1, 2003

(54) TECHNIQUE FOR AUTOMATICALLY AND TRANSPARENTLY TRANSFORMING SOFTWARE COMPONENTS INTO SOFTWARE COMPONENTS CAPABLE OF EXECUTION IN A CLIENT/SERVER COMPUTING ENVIRONMENT

(75) Inventor: Steven D. Ims, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,315

(22) Filed: Mar. 22, 2000

(51) Int. Cl.[7] ............................. G06F 12/00; G06F 9/00
(52) U.S. Cl. ....................... 707/204; 707/200; 709/315
(58) Field of Search ..................... 707/9–10, 103–104, 707/523, 204, 527; 709/230–236, 300, 225, 250, 315; 717/1, 6, 125, 143; 714/1, 15, 48

(56) References Cited

U.S. PATENT DOCUMENTS 6,161,107 A * 12/2000 Stern ........................... 707/104
6,286,051 B1 * 9/2001 Becker et al. ............... 709/236
6,385,769 B1 * 5/2002 Lewallen ..................... 717/125

\* cited by examiner

*Primary Examiner*—Safet Metjahic
*Assistant Examiner*—Te Yu Chen
(74) *Attorney, Agent, or Firm*—Jeanine S. Ray-Yarletts; Marcia L. Doubet

(57) ABSTRACT

A method, system, and computer program product for automatically transforming software components written for stand-alone execution such that they can be executed as client/server components in a distributed network computing model. A proxy is programmatically generated when the component is requested at run-time, where the proxy has an identical interface to the actual component. This enables the remote proxy to reflect the most up-to-date version of the component, which is especially advantageous if code component interfaces are being changed over time. Furthermore, this technique enables the proxy to access the most current version of the component. (Alternatively, already-existing proxy code may be retrieved, where the proxy has been created by a developer.) Run-time information may be used to select the component to be accessed. A generic client application and generic server application pair is defined, which functions to route information between an arbitrary remote proxy and an arbitrary remote (actual) component.

21 Claims, 6 Drawing Sheets

TECHNIQUE FOR AUTOMATICALLY AND TRANSPARENTLY TRANSFORMING SOFTWARE COMPONENTS INTO SOFTWARE COMPONENTS CAPABLE OF EXECUTION IN A CLIENT/SERVER COMPUTING ENVIRONMENT

RELATED INVENTION

The present invention is related to the IBM invention having Ser. No. 09/533,314, entitled "On-Demand Generation, Packaging, and Delivery of Archive Files", filed concurrently herewith on Mar. 22, 2000.

1. Field of the Invention

The present invention relates to computer programming, and deals more particularly with a method, system, and computer program product for automatically transforming software components written for stand-alone execution such that they can be executed as client/server components in a distributed network computing model.

2. Description of the Related Art

The client-server model for distributed computing has been in use for a number of years. In this model, a program called the "client" makes a request for service from another program called the "server". Typically, the machines on which the client and server programs execute are different and are connected through a network such as the Internet, or a corporate intranet or extranet. Some of the code for performing the application is resident on, and executes on, the client machine while other code resides on, and executes on, the server machine.

A client/server application (that is, an application intended to be executed in a client/server distributed computing environment) is developed in a particular manner to enable the code to execute properly at run-time. An agreed-upon communications protocol must be used by both the client and server code, in order to exchange each request for service and its response.

An early protocol used with client/server computing is the Remote Procedure Call ("RPC"). With RPC, a programmer codes a module invocation (i.e. a procedure call) in the normal manner for the programming language in which he is writing, but only a "stub" for that module is generated during program compilation (where a "stub" is a special construct enabling the program to successfully compile without resolving the address of the referenced procedure). If the procedure is actually called during runtime, a request to execute the code will be forwarded to a server where the module is available (hence, the procedure call is a "remote" procedure call). That server will perform the function of the procedure, and return the results to the client workstation, transparently to the user. (For a detailed description of RPC, refer to international standard ISO/IEC 11578, "Remote Procedure Call (RPC)", dated 1996.)

Another technique that enables this type of distributed computing, which is usable in object-oriented environments, is known as DSOM, or "Distributed System Object Model". SOM®, or "System Object Model", is an International Business Machines Corporation ("IBM") implementation of the CORBA® (Common Object Request Broker Architecture) standard developed by the Object Management Group. ("SOM" is a registered trademark of IBM, and "CORBA" is a registered trademark of Object Management Group, Inc.) SOM defines a way to create objects that can be accessed by programs without regard to the programming language in which the program is written, the specific compiler used to compile the programs, etc. DSOM, also from IBM, extends the SOM by defining a way to distribute SOM objects, so that they can be accessed by remotely executing applications. In addition, Microsoft has developed the Component Object Model, or COM, technology as an alternative to DSOM and CORBA. (The details of CORBA, SOM, DSOM, and COM are beyond the scope of this discussion. Reference may be made to "The Common Object Request Broker: Architecture and Specification", OMG Document Number 91.12.1 Revision 1.1, for more information on CORBA, and to "SOMobjects Publications", IBM document number S96F-8649, for more information on SOM and DSOM.)

The Java™ programming language provides yet another technique for operating with only some portion of the executable program being loaded on the client workstation. ("Java" is a trademark of Sun Microsystems, Inc.) Whereas RPC, DSOM, CORBA, and COM provide for accessing remotely-stored procedures and objects, Java provides a different approach through use of Java applets. A Java applet is a special type of software component which is intended to be dynamically downloaded at run-time to a client machine along with a Web page which invokes the code in the applet. The Java applet code modules (referred to as "classes") are loaded from their remote storage onto the client workstation if and when they are needed (i.e. if they are actually invoked during execution), so that execution occurs locally. Another Java technique is Remote Method Invocation, or "RMI", which provides for execution of remotely-located Java methods, in a similar manner to that described above for remote execution using RPC, DSOM, CORBA, and COM. RMI is a technique for use in distributed Java applications, whereby the methods of a remote Java object can be invoked from other Java virtual machines, even though the virtual machine may be operating on a different server than the one on which the object is located. This is accomplished by making a reference to the object available to the application that wishes to invoke one of the object's methods. The reference can be made available either by the application program looking up the object's location (using a method invocation) in a bootstrap naming service provided by RMI, or by passing the reference information for the object as a parameter to the application. This reference is then used when invoking the object's method, and serves to automatically route the request to the proper location.

The prior art techniques which have been described all provide for accessing remotely-stored code—whether by executing the code at the remote server (as described for RPC, DSOM, CORBA, COM, and RMI), or by downloading a copy for execution on the client machine (as described for Java applets). The remote execution techniques all have in common a requirement to provide special programming considerations, a priori, to enable the remote execution capability of each individual component. RMI, DSOM, CORBA, and COM, for example, require that a "proxy" version of each remotely-stored software component is generated and then distributed to the client machine(s) which will access the components. At run-time, client software using these techniques must call a search routine to locate the proxy versions. In addition, when using RMI, the remotely-stored components must be pre-registered with the RMI bootstrap naming service.

There are a number of drawbacks to these existing techniques for distributed computing. First, the special preparations which are required for remote execution make writing distributed programs more complex. In addition, once a program has been created for execution in this way, its flexibility is constrained in that it must continue to be executed in a distributed fashion (or else must be rewritten for other execution modes, such as stand-alone execution). Similarly, there is currently no convenient way for a program which is written to operate outside the distributed computing environment (as a locally-executed, stand-alone component, for example) to take advantage of the distributed model without some amount of manually rewriting the code.

Furthermore, the existing techniques for distributed computing are unsuitable in some scenarios. RPC, for example, is not adapted to object-oriented computing. And while use of applets is a very popular and powerful technique for dynamic distribution of code, there are situations in which this technique cannot operate as currently defined. In the legacy host environment, for example, software components written as objects are being developed to access legacy host data (where these objects enable, inter alia, replacing procedural language data access software developed for prior computing architectures such as the 3270 data stream architecture). For reasons which are not pertinent to the present invention, is it not possible to execute certain of these objects remotely. Instead, they must execute at a server. (The HostPublisher product from IBM may be used for accessing legacy host data with objects in this manner, in which case the objects must execute on a HostPublisher server.) Applications developed using these objects must then be written to run completely on the same server as the legacy access objects, or the application must be specially designed for the client/server environment to enable the legacy access objects to execute at the remote server while other parts of the software execute at a client. This requirement to pre-select an execution mode limits the developer's flexibility in designing applications, and is a stumbling block to efficient deployment of an object-oriented solution to legacy data access.

Accordingly, a need exists for a technique by which these shortcomings in the prior art can be overcome. The present invention defines a novel approach to solving these problems, providing for automatic and transparent transformation of software components into components that can be used in a client/server application without requiring the code of the invoking application to be changed.

SUMMARY OF THE INVENTION

An object of the present invention is to provide a technique whereby shortcomings in prior art distributed computing techniques can be overcome.

Another object of the present invention is to provide a technique for automatically and transparently transforming components created for stand-alone execution into components that can execute in a client/server environment.

Still another object of the present invention is to provide this technique such that the code of the application which invokes the components does not need to change.

Yet another object of the present invention is to create applications and components which can execute in a stand-alone mode or in a client/server mode, without requiring a developer to change the applications or components.

It is another object of the present invention to provide this technique such that a proxy is automatically generated for the components, where the proxy will execute on the client and the component will remain remotely located.

It is yet another object of the present invention to provide this proxy generation in an on-demand, dynamic manner.

A further object of the present invention is to enable the generated proxy code to reflect the most up-to-date version of the remotely-located component.

Another object of the present invention is to enable generation of a proxy based upon the client environment from which it will be used.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for automatically transforming software components written for stand-alone execution such that they can be executed as client/server components in a distributed network computing model. This technique comprises: automatically sending a request for an archive file to a first server over a first network connection, responsive to encountering a reference to the archive file during execution of code on a client workstation, and wherein the request identifies a dynamic archive builder accessible from the first server; dynamically building the requested archive file, wherein the dynamically built archive file contains a proxy for a remote component, the proxy having an interface which is identical to that of the remote component; returning the dynamically built archive file to the client workstation and transparently accessing the remote component during execution of a program contained in the returned archive file at the client workstation, as if the remote component was being executed locally at the client workstation, by accessing the interface of the proxy.

Optionally, dynamically building the requested archive file may further comprise programmatically generating the proxy. The programmatic generation may further comprise: instantiating an instance of the remote component; determining a set of input methods used to set input properties of the instance; determining a set of output methods used to get output properties of the instance; determining one or more execution methods used to execute the instance; generating the interface to have the input methods, the output methods, and the one or more execution methods; and generating source code of the proxy to perform a different version of each of the one or more execution methods, wherein each of the different versions causes invocation of a corresponding one of the one or more execution methods of the remote component.

The transparent access may further comprise: sending a set of parameter name/value pairs which are required by the remote component from said proxy to a generic client application executing on the client workstation; forwarding the set of parameter name/value pairs from the generic client application to a generic server application over a second network connection, wherein the generic server application is executing on a second server and wherein the first network connection and the second network connection may or may not be different and the first server and the second server may or may not be different; invoking the remote component by the generic server application, using the forwarded parameter name/value pairs; and returning results of the invocation to the program.

Returning the results may further comprise: sending the results from the generic server application to the generic client application over the second network connection; forwarding the sent results from the generic client application to the proxy; using the input methods and the output methods of the generated interface to reflect the results, and obtaining the results by the program through use of the output methods.

The invoking may further comprise: instantiating an instance of a particular remote component specified by one of the parameter name/value pairs; determining a particular input method used to set a particular input property of the instance, and invoking the determined particular input method to set an input property of the instance to an input value, wherein the particular input method and the input value are specified by another one of the parameter name/value pairs; invoking a particular execution method of the instance, wherein the particular execution method is specified by yet another one of the parameter name/value pairs, and wherein the invocation yields an execution result; determining one or more output methods used to get each output property of the instance, and for invoking each of the determined output methods to get the output properties of the instance as output values; and formatting the output properties and the output values as output parameter name/value pairs, thereby creating the results of the invocation.

The remote component may be a Java bean.

The present invention will now be described with reference to the following drawings, in which like reference numbers denote the same element throughout.

DESCRIPTION OF THE PREFERRED EMBODIMENT

Figure 1:
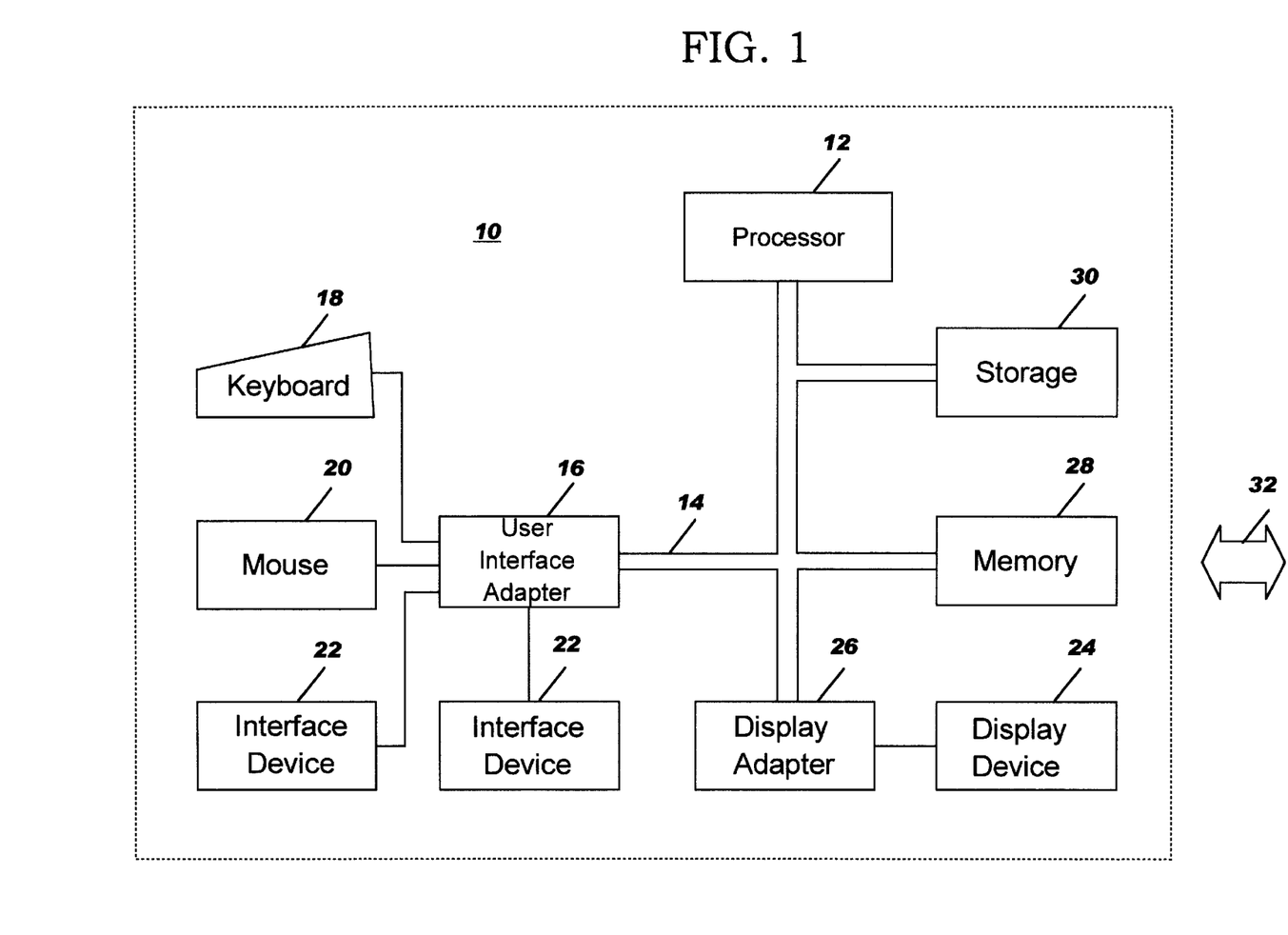
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
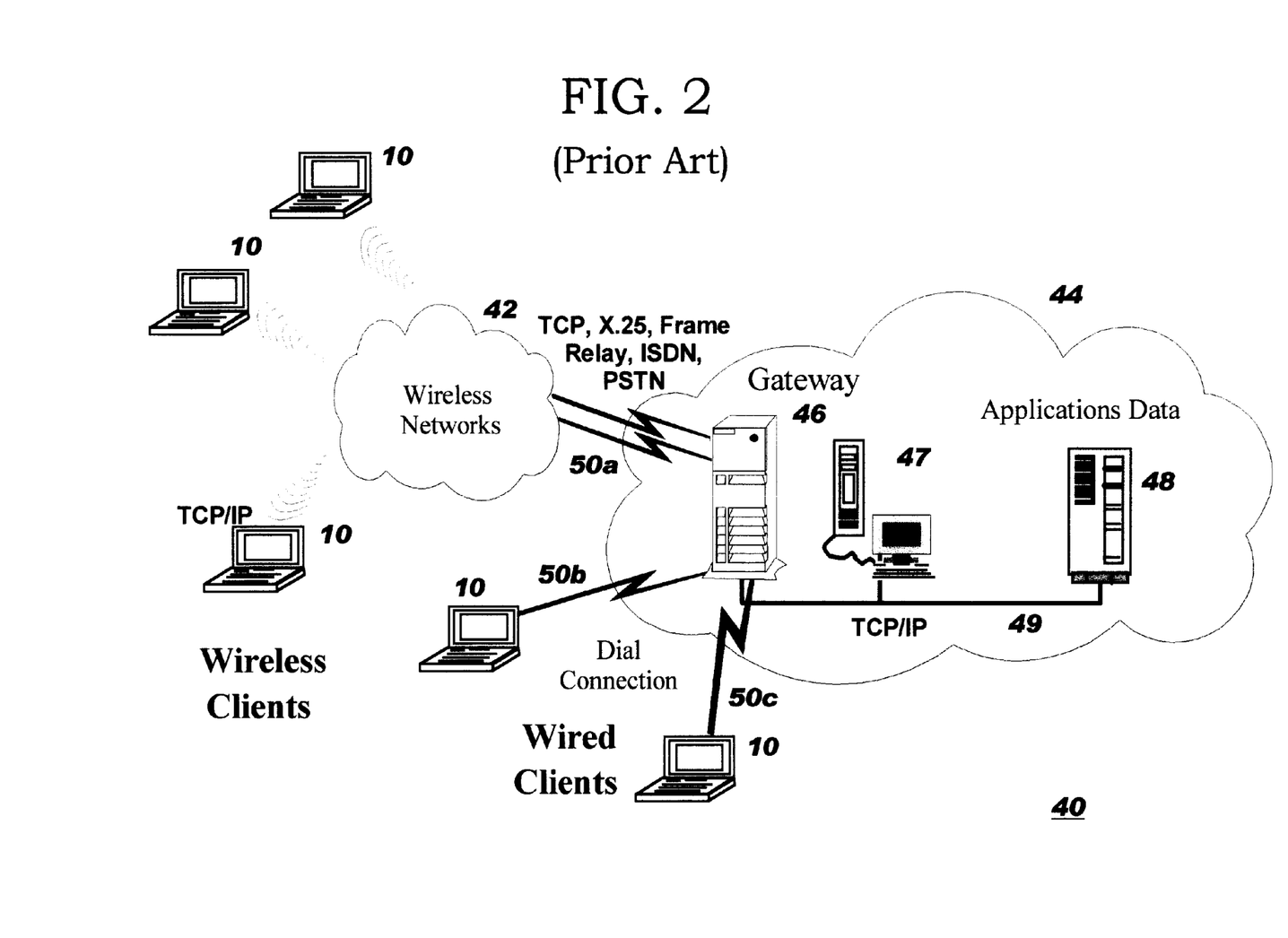
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. ("Enterprise Systems Architecture/370" is a trademark of IBM, "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in. Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers, etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as a computer software program. In the preferred embodiment, the present invention is implemented as one or more modules (also referred to as code subroutines, or "objects" in object-oriented programming). The server to which the client computer connects when using the present invention may be functioning as a Web server, where that Web server provides services in response to requests from a client connected through the Internet. Alternatively, the server may be in a corporate intranet or extranet of which the client's workstation is a component, or in any other networking environment. For ease of reference, the server is referred to herein as a "Web server". The present invention operates independently of the communications protocol used to send messages or files between the client and server, although the HTTP (HyperText Transfer Protocol) protocol running on TCP/IP is used herein as an example.

The present invention provides an automatic, transparent technique for transforming components written for execution outside the distributed computing environment (as stand-alone components to be executed in a remote server, for example) into components that can be executed in a client/server computing environment. Through use of this technique, an application program can be developed and tested on a single machine, and then deployed as a "split" client/server application with its executable code residing on different machines, without requiring the developer to change the application code. ("Split" application refers to the fact that some code components reside on the client machine, and will execute at the client, while other components reside on the server machine, and are executed at the server upon a remote invocation from the client.) A pair of generic client and server applications is defined herein, which enables any program component residing on a remote server to be transparently accessed from any client.

Furthermore, when used with the teachings of the related invention, which is hereby incorporated by reference, a version of the code which is to remain on the remote server is automatically and dynamically made available to the code executing on the client machine in a manner that is transparent to the client application. The related invention provides a technique for on-demand generation, packaging, and delivery of content in an archive file. An "archive builder" provides application-specific control over generating each particular archive file. When the executable code in the archive needs to access a remotely-located component, according to the present invention, a proxy for the remote component is generated by the archive builder as part of the archive file. The proxy generation is provided in an on-demand, dynamic manner, and therefore the most up-to-date version of the remote component is reflected in (and will subsequently be invoked from) the generated proxy. This advantage is particularly important in situations where code components and/or their interfaces change frequently. For example, if new executable code is written for a particular code component, then this new executable code will be accessed from the proxy. If the interface to the code component changes, then the present invention enables this new interface to be automatically used in the generated proxy. At runtime, the downloaded proxy executes on the client machine, enabling the client to access the remote component on the server as if the remote component was locally available.

In addition, use of the related invention enables a proxy for use with the present invention to be automatically generated in a customized manner based upon the client environment from which it will be used. Examples of attributes of the client environment that may be used to customize dynamically-generated components has been described in detail in the related invention with reference to generation of archive files. This description applies equally when the archive files include references to components that will be remotely accessed for use by the present invention, and thus will not be described in detail herein. As one example of how this customization feature may be used, suppose a particular code component that is to be accessed can only be executed on a specific backend data server. A name or other identifier of the data server can be passed as a parameter to the archive file creation process (according to the related invention), such that the proxy which is generated for use with the present invention accesses the code component on that required backend data server. As another example, a proxy for a particular function may need to have one interface when used with an Internet Explorer browser, and another interface when used with a Netscape Navigator browser. A parameter value identifying the browser in use can be passed to the archive builder in this example.

The present invention has been used to implement a new client/server application for IBM's HostPublisher version 2.2 product. This application enables remote client access to objects which are generated by HostPublisher and which are referred to as "IntegrationObjects". An IntegrationObject is an application-specific encapsulation of legacy host access code, or database access code, specified as a reusable Java bean. These IntegrationObjects can be executed only within the HostPublisher server environment. Remote access to these objects is enabled through use of the present invention by dynamically generating proxy objects which can each execute within a client workstation and communicate to the corresponding (actual) IntegrationObject.

The preferred embodiment of the present invention will now be discussed in more detail with reference to FIGS. 3 through 6.

The present invention may be used advantageously with Java applets or applications, and with Java archive ("JAR") or cabinet ("CAB") files which are used to dynamically download file content to client software executing on a client machine. JAR files are used in the discussions herein for ease of reference.

When the present invention is used with applications, an application executing on the client machine includes one ore more references to Java bean components. Java beans are reusable code components, as is well known in the art. A bean has a set of input properties and a set of output properties, and typically also has one or more methods which can be called to invoke the bean's functionality (referred to hereinafter as the bean's execution method or methods). To use a bean, it is first instantiated, and then values of the bean's input properties are set as required by a particular application. The invoking logic then calls the bean's execution method. Once the functionality of the bean has completed, its results are accessible to the invoking logic by accessing the bean's output properties.

Figure 3:
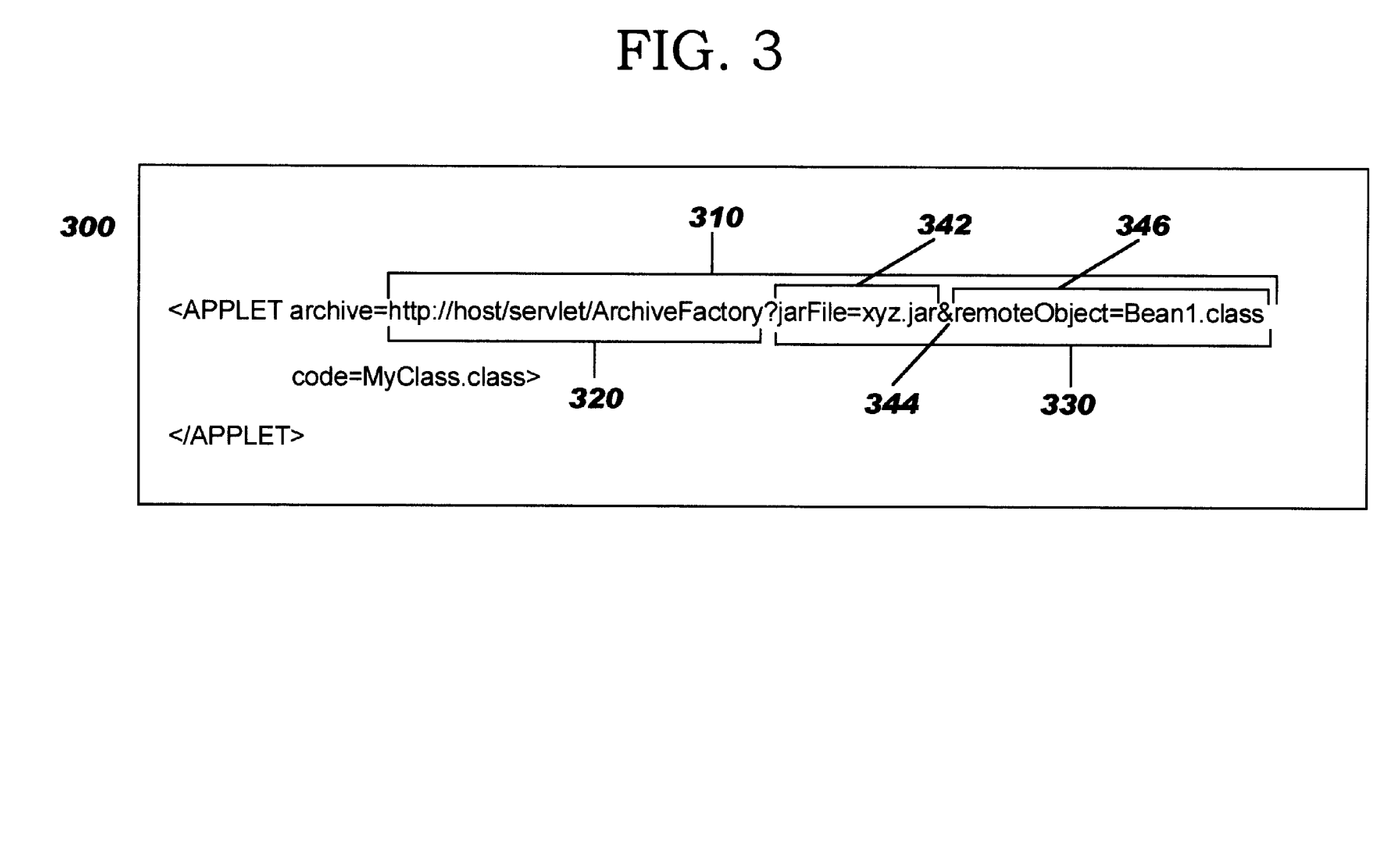
FIG. 3 depicts the syntax that may be used to request delivery of a remotely-located component, for which a proxy will be dynamically generated according to a preferred embodiment of the present invention.

When the present invention is used with applets, one or more bean references are encoded in the executable applet software which is dynamically downloaded at run-time to a browser in a client machine using an archive file. The archive file is automatically retrieved and unpackaged by current browser implementations upon processing an <APPLET> tag, where an "archive=archive_file name" parameter is used on the <APPLET> tag to specify which archive file is to be retrieved, and a "code=starting_class_name" parameter is used to identify the Java class which contains the entry point of the applet which is packaged in that archive file. When the <APPLET> tag is used in a Web page, actual parameter values are substituted for these italicized terms. FIG. 3 depicts an example of how this <APPLET> syntax may be extended, according to the related invention, to request delivery of a dynamically-generated archive file. Rather than simply specifying a file name as the value of the archive parameter, the related invention enables specifying a URL (Uniform Resource Locator) identifying the network location of a server application (referred to herein as a "dynamic archive builder" or "archive factory") which will generate and package the archive file. The extended applet tag syntax 300 is preferably used, where the server application is identified in the archive parameter 310 using a URL reference 320 and a parameter list 330 (appended as a standard URL query string) which specifies one or more parameters to be used by that application. In the example parameter list 330, a first parameter name/value pair 342 provides a name for the resulting archive file. The second pair 346 provides an identifier of a remote object (i.e. a bean class) which is to be accessed by the applet using proxy code that will be generated in the archive file. An ampersand 344 is used as a separator between the name/value pairs 342, 346. (While two pairs 342, 346 are shown in FIG. 3, this number may be reduced or extended as required for a particular server application.) The actual parameter values used with the present invention may be statically assigned (i.e. hard-coded) on the <APPLET> tag. Alternatively, values may be assigned dynamically when appropriate, using client-side or server-side processing as discussed in the related invention. The manner in which the parameter values are used in generating the archive file has been described in the related invention, and will be described in more detail below with reference to FIG. 5 as these parameters are used by the present invention to deliver a remote proxy to the client workstation.

When the present invention is used with CAB files instead of JAR files, the archive information is preferably specified in a tag having the syntax <PARAM name=cabinets value=URL_reference?cabFile=file_name.cab/>and which is coded as a subtag, or child tag, of the APPLET tag. (Cabinet files may be used with applets or to package content to be used with applications, as is well known in the art.)

Figure 4:
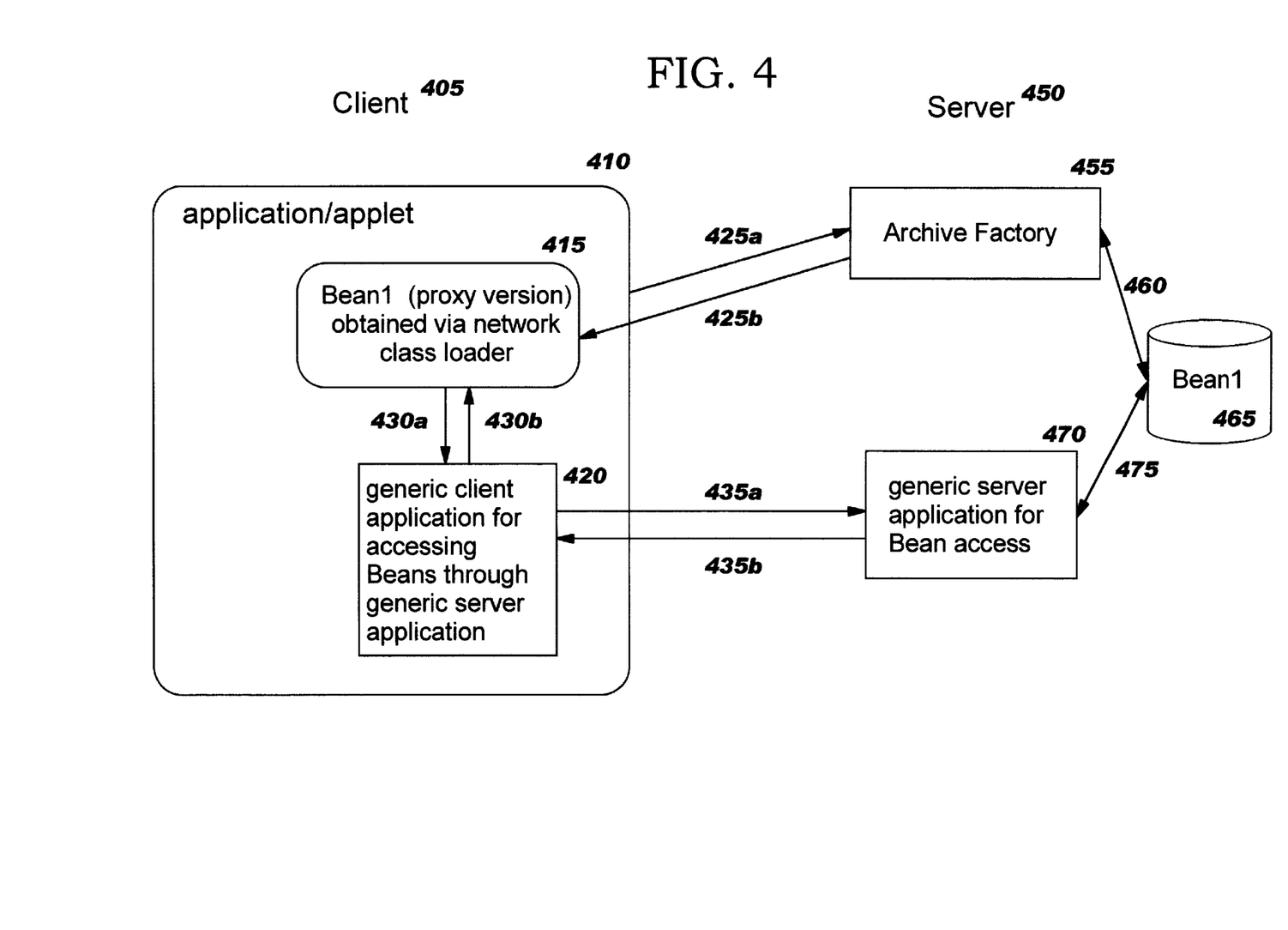
FIG. 4 depicts the flow of messages between a client machine, a Web server, and a remotely-located code component, according to the present invention.

FIG. 4 depicts the flow of messages between a client machine 405, a Web server 450, and an example of a remotely-located code component 465, according to the present invention. An application or applet 410 (referred to hereinafter as the "application" unless otherwise stated) is executing on client machine 405. A reference to a component such as a Java bean is encountered as the application executes, as previously described. In the application case, the application contains code to instantiate the bean, sets its input properties, call its execution method, and then use values from its output properties. In the applet case, similar code is contained within the applet that will be dynamically downloaded to the client machine in response to encountering the <APPLET> tag.

A Java class loader locates the class required for a referenced bean, as in the prior art. For applets; a network class loader is used, where the class to be loaded must reside on the same machine from which the applet was downloaded. (This is a security restriction imposed by the applet architecture, commonly referred to as the "Java sandbox" restriction.) Upon encountering an <APPLET> tag during execution, the network class loader sends a message 425a to an archive builder application 455 at Web server 450. That archive builder (described in more detail with reference to FIG. 5) then builds, on-demand, a proxy to be included in an archive file (which may be customized according to parameters 330 from the URL reference 310), using the techniques disclosed in the related invention. Creation of the archive file uses information retrieved 460 by the archive builder about the bean 465 which is to be accessed from the applet in the archive file, where bean 465 is stored on some remote server (where the bean's code will execute). The generated archive file is then returned 425b to the client 405. When this archive file is unpackaged, the bean proxy 415 executes on the client 405 as a proxy for the actual bean instance 465.

For applications, a class loader may be used in general, according to the prior art, to locate the classes referenced by the application using information from the CLASSPATH environment variable. For classes which cannot be found locally, such as the beans which are to reside at a remote server when using the present invention, the failure to locate the class then causes invocation of the network class loader which will request 425a the bean from the archive builder 455 at server 450. The bean proxy is created and returned 425b, where proxy 415 then executes on the client 405.

When the bean's execution method is invoked by application 410, the proxy's execution method receives the invocation. The proxy's execution method is generated to know that it must request remote execution from a server. Thus, generic client application 420 is invoked 430a to perform the remote execution, after which results are returned 430b to the proxy 415. According to the present invention, this generic client application 420 functions only to route information 435a, 435b between remote proxy 415 and generic server application 470. Generic server application 470 routes information 475 between generic client application 420 and bean instances such as bean 465. The processing that occurs when the bean's execution method is invoked at run-time will be described in more detail below with reference to FIG. 6.

Figure 5:
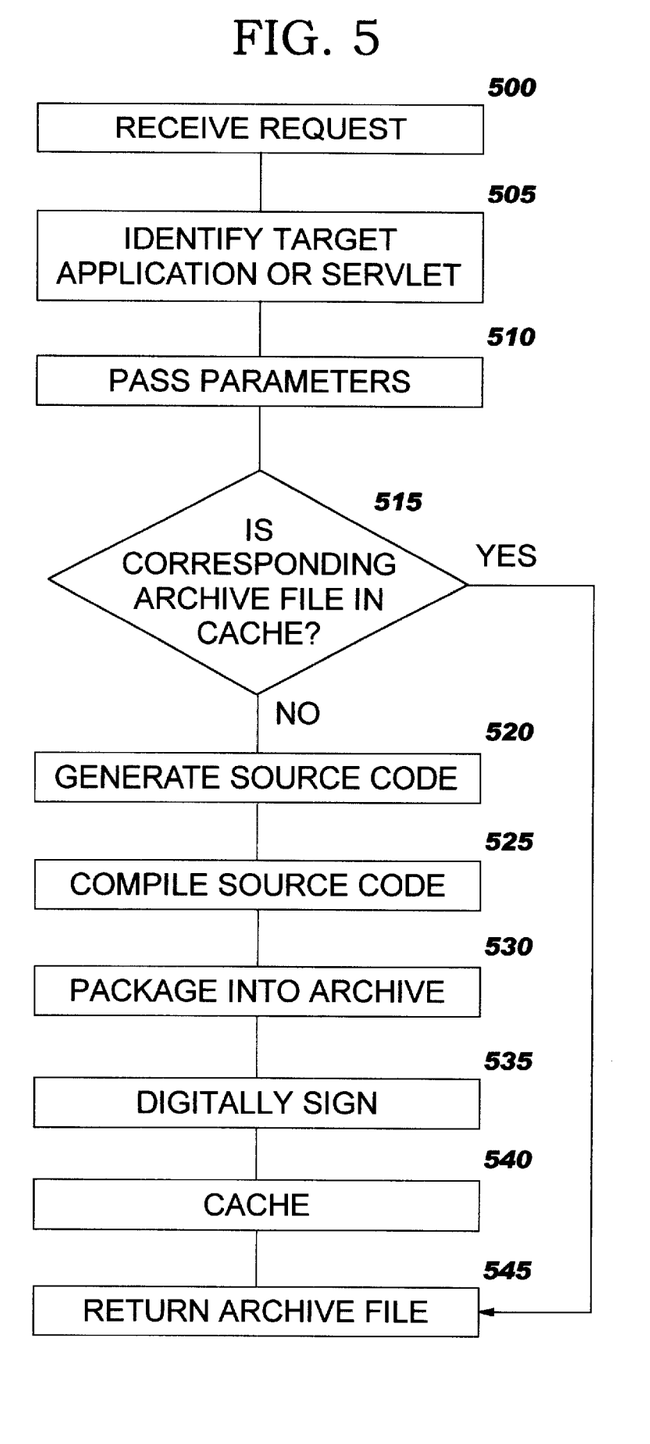
FIG. 5 depicts the logic which may be used to generate a remote proxy, according to a preferred embodiment of the present invention.

FIG. 5 depicts the logic which may be used to generate the remote proxy 415 by archive factory 455. This logic is invoked at a server 450 upon receiving request 425a which requests delivery of an archive file containing applet code. The processing begins at Block 500, where this request is received. At Block 505, the target archive generating application specified on the request is identified. Block 510 passes the parameters from the request 425a to this target, which will use the parameter values in an application-dependent manner for preparing (and customizing, when applicable) the archive file. As previously stated, when the applet code is to contain one or more references to remotely-located Java beans, then the application-dependent processing of the archive builder includes creating (or retrieving) a remote proxy for those beans.

According to the preferred embodiment, a cache of archive files is maintained, where the parameter information used in creating each archived file is used as an identifier or index to distinguish among the cached files. As with caches of the prior art, use of an archive cache with the present invention enables faster, more efficient delivery of requested content for subsequent requests of a previously-cached file. However, this optimization may be omitted without deviating from the inventive concepts of the present invention. When the cache is implemented, Block 515 checks to see whether the parameters passed at Block 510 identify an already-cached file. If so, then control transfers to Block 545; otherwise, processing continues at Block 520.

Block 520 generates or retrieves, as applicable, the archive content to create a remote proxy for a bean (such as bean 465 of FIG. 4), where the remote proxy has an identical signature to the original bean. (Portions of the content to be used in the archive file may have already been generated. In this case, that content is simply retrieved.) Creating the proxy source code is done by first instantiating an object of the bean's class. Introspection techniques of the prior art are then used to retrieve all the input property methods (also referred to as "setter" methods) and output property methods ("getter" methods), as well as the execution method(s) of this object. Source code for a proxy is then programmatically generated to have this same signature. The execution method in this proxy is generated such that it communicates with the generic client application in order to perform invocations of the original bean 465.

The parameter values passed at Block 510 are preferably used in this content generation process. The parameters may identify which remotely-located bean is to be accessed by a proxy, and therefore how to create the appropriate remote proxy by the archive builder. For example, multiple beans performing a similar function may be available for access, where a particular one of the beans is to be selected if the client is executing the Internet Explorer browser and a different bean is selected when executing Netscape Navigator. Examples of other information that may be useful for customizing an archive file to reflect attributes of the client workstation environment include: the client's device type; operating system type; JVM (Java Virtual Machine) level; security API (Application Programming Interface) in use by the client browser; which user interface library is available (Swing, AWT, and so forth); a name or other identification of the workstation user; etc. Values of attributes such as these are available for access using prior art techniques, and may be assigned as parameter values. Sample parameter name/value pairs for information of this type are:

remoteObjectName=Bean1.class
    osName=Windows_NT_4.0
    jvmLevel=jdk1.1

(indicating the remote object name, operating system type, and the JVM level, respectively).

The generated or retrieved content may then be compiled, as necessary, into one or more class files at Block 525. The compiled code may then be compressed (using existing techniques such as Lempel-Ziv compression), if desired, and is then packaged (Block 530) into an archive file. Preferably, the archive file is then digitally signed at Block 535, using techniques which are well known in the art.

At Block 540, the dynamically created archive file is cached (when the caching optimization is implemented), along with the parameter information which will enable subsequent lookup and retrieval of a selected cached archive file. The archive file which has been newly created according to the processing of Blocks 520–535, or which has been located in the cache at Block 515, is then returned to the requester at Block 545. The processing of FIG. 5 then ends for this invocation.

The present invention may also be used advantageously where the proxy code has already been explicitly created prior to run-time, for example by a developer of the bean class. In this situation, the processing which occurs is analogous to that which has been described when an already-cached instance is located by Block 515 of FIG. 5.

Figure 6:
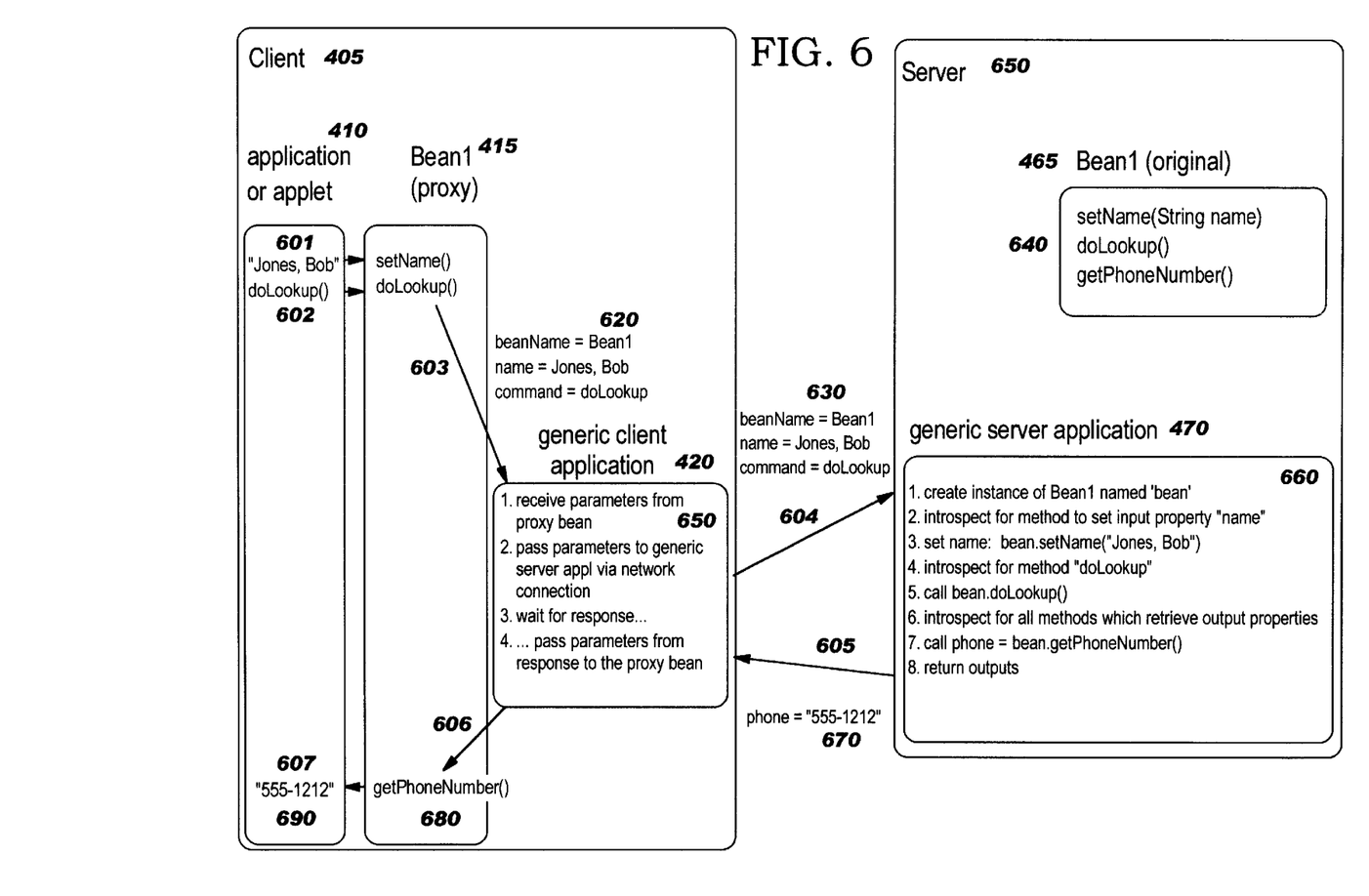
FIG. 6 depicts the flow of messages that occurs at run-time, according to the present invention.

FIG. 6 depicts the flow of messages and the processing that occurs at run-time when the bean's execution method is invoked, according to the present invention. The application 410 executes on client machine 405, as stated. For purposes of illustration, suppose the application invokes a bean instance 465 where that bean looks up the telephone number of a person whose name is supplied as a bean input property. This bean instance resides on a remote server 650, which may be the same server 450 on which the archive builder of FIG. 4 resides, or may be a different server. As shown at 640, the bean in this example has methods "setName" to set the input property; "doLookup" to search a database or other repository for the phone number using the name as an index or key; and "getPhoneNumber" to retrieve the resulting phone number from an output property. The application therefore sets 601 an input property, which in this example has the value "Jones, Bob", by invoking the setName method on the proxy 415. The doLookup method of proxy 415 is then invoked 602. Note that these steps 601, 602 (as well as step 607, discussed below) are performed identically from application 410, whether the bean instance 465 that will perform the required function is remotely located as in FIG. 6 or is locally available. Thus application 410 can be deployed on an arbitrary machine, whether in a client/server environment such as that depicted in FIG. 6 or on the same machine 650 on which the actual bean instance 465 executes.

When the proxy's execution method is invoked 602, its function is to pass 603 a set of parameters 620 to generic client application 420 and await a response 606 (where message flows 603, 606 correspond to messages 430a, 430b in FIG. 4). Note that the interface to generic client application 420 is independent of which bean proxy it is used with. In the general case, the generic client application 420 requires an identification of the remote bean that corresponds to the bean proxy 415, a list of name/value pairs for the parameters in that bean's signature, and a command to be executed by the remote bean. A set of arbitrary result parameters is then returned to the invoking proxy. In this example, the parameters 620 are the bean's name "Bean1"; the bean's single input property "name" and its value "Jones, Bob"; and the command "doLookup".

As shown at 650, the function of generic client application 420 is to (1) receive information from an arbitrary bean proxy; (2) pass those parameters to the generic server application 470 over a network connection; (3) wait for a response; and (4) pass the result parameters back to the bean proxy. The format used to transmit the request parameters and the response between elements 420 and 470 does not form part of the present invention. Preferably, a well-defined notation such as the Extensible Markup Language (XML) is used.

Message flow 604 shows the parameters 630 being passed to generic server application 470. (Messages 604 and 605 correspond to messages 435*a* and 435*b* of FIG. 4.) In the general case, the function of generic server application 470 is to (1) parse information from an incoming request; (2) invoke the requested command on the requested bean instance; and (3) return an arbitrary number of output parameters (where the number varies depending on the interface of the requested bean instance). As shown at 660, the steps in this process for the telephone number lookup example are:

(1) locate the actual bean class 465 of "Bean1" which has been requested in parameter set 630, and instantiate it, creating an instance which is referred to in this example as having the name "bean";

(2) use introspection to determine which setter method is used to set the "name" input property, according to the second parameter requested in parameter set 630;

(3) set the input property using an invocation syntax of "bean.setname("jones, bob"), using the name of the newly-created instance, the setter method name, and the property value passed in parameter set 630;

(4) use introspection to determine the interface to the "dolookup" method, which corresponds to the command requested in 630;

(5) invoke this "bean.dolookup( )" method, which is assumed to use the supplied input property to search for the person's phone number and set an output property to that number;

(6) use introspection to determine the set of methods which retrieve output property values from instances of this bean class;

(7) invoke the single getter method shown at 640 using a syntax of "phone=bean.getPhoneNumber( )" to retrieve the output property value and store it into a variable named "phone"; and (8) format the retrieved output property values into a list of arbitrary parameter names and values, which in this example is 'phone="555–1212"' as shown at 670, and return 605 that list to generic client application 420.

As will be obvious, steps (3) and (7) are repeated if more than one setter and getter method is defined for a particular bean class.

Upon receiving the parameter list 670 by generic client application 420, the parameter names and values are parsed from this list and passed 606 back to bean proxy 415, which uses them to set the appropriate output properties of the proxy 415. Because proxy 415 has an identical interface 640 to actual bean 465, application 410 then obtains the results of executing bean 465 by invoking 607 the same getter method "getPhoneNumber" 680 on proxy 415, which yields the value "555–1212" as shown at 690.

As has been demonstrated, the present invention provides a very powerful and flexible technique for transforming components (referred to herein as java beans for purposes of illustration and not of limitation) written for execution in a stand-alone, remote environment into components that can be accessed locally on a client workstation in a client/server environment.

While the preferred embodiment of the present invention has been described, additional variations and modifications in that embodiment may occur to those skilled in the art once they learn of the basic inventive concepts. In particular, while the present invention has been described with reference to the Java programming language and certain features of that language, the inventive concepts disclosed herein may be adapted to changes in this language or its features, and may be used with alternative languages and/or features which function in an analogous manner to those discussed herein. Therefore, it is intended that the appended claims shall be construed to include both the preferred embodiment and all such variations and modifications as fall within the spirit and scope of the invention.

I claim:

1. A computer program product for automatically and transparently transforming software components into software components capable of execution in a client/server computing environment, said computer program product embodied on a computer-readable medium and comprising:

computer-readable program code means for automatically sending a request for an archive file from a client workstation to a first server over a first network connection, responsive to encountering a reference to said archive file during execution of code on said client workstation, and wherein said request identifies a dynamic archive builder accessible from said first server;

computer-readable program code means for dynamically building said requested archive file by said dynamic archive builder, wherein said dynamically built archive file contains a proxy for a remotely-located component, said proxy having an interface which is identical to that of said remotely-located component;

computer-readable program code means for returning said dynamically built archive file to said client workstation over said first network connection; and computer-readable program code means for transparently accessing said remotely-located component during execution of a program contained in said returned archive file at said client workstation, as if said remotely-located component was being executed locally at said client workstation, by accessing said interface of said proxy.

2. The computer program product according to claim 1, wherein said computer-readable program code means for dynamically building further comprises computer-readable program code means for programmatically generating said proxy.

3. The computer program product according to claim 2, wherein said computer-readable program code means for programmatically generating further comprises:

computer-readable program code means for instantiating an instance of said remotely-located component;

computer-readable program code means for determining a set of input methods used to set input properties of said instance;

computer-readable program code means for determining a set of output methods used to get output properties of said instance;

computer-readable program code means for determining one or more execution methods used to execute said instance;

computer-readable program code means for generating said interface to have said input methods, said output methods, and said one or more execution methods; and computer-readable program code means for generating source code of said proxy to perform a different version of each of said one or more execution methods, wherein each of said different versions causes invocation of a corresponding one of said one or more execution methods of said remotely-located component.

4. The computer program product according to claim 1, wherein said computer-readable program code means for transparently accessing further comprises:

computer-readable program code means for sending a set of parameter name/value pairs which are required by said remotely-located component from said proxy to a generic client application executing on said client workstation;

computer-readable program code means for forwarding said set of parameter name/value pairs from said generic client application to a generic server application over a second network connection, wherein said generic server application is executing on a second server and wherein said first network connection and said second network connection may or may not be different and said first server and said second server may or may not be different;

computer-readable program code means for invoking said remotely-located component by said generic server application, using said forwarded parameter name/value pairs; and computer-readable program code means for returning results of said invocation to said program.

5. The computer program product according to claim 4, wherein computer-readable program code means for returning results further comprises:

computer-readable program code means for sending said results from said generic server application to said generic client application over said second network connection;

computer-readable program code means for forwarding said sent results from said generic client application to said proxy;

computer-readable program code means for using said input methods and said output methods of said generated interface to reflect said results; and computer-readable program code means for obtaining said results by said program through use of said output methods.

6. The computer program product according to claim 4, wherein said computer-readable program code means for invoking further comprises:

computer-readable program code means for instantiating an instance of a particular remotely-located component specified by one of said parameter name/value pairs;

computer-readable program code means for determining a particular input method used to set a particular input property of said instance, and for invoking said determined particular input method to set an input property of said instance to an input value, wherein said particular input method and said input value are specified by another one of said parameter name/value pairs;

computer-readable program code means for invoking a particular execution method of said instance, wherein said particular execution method is specified by yet another one of said parameter name/value pairs, and wherein said invocation yields an execution result;

computer-readable program code means for determining one or more output methods used to get each output property of said instance, and for invoking each of said determined output methods to get said output properties of said instance as output values; and computer-readable program code means for formatting said output properties and said output values as output parameter name/value pairs, thereby creating said results of said invocation.

7. The computer program product according to claim 1, wherein said remotely-located component is a Java bean.

8. A system for automatically and transparently transforming software components into software components capable of execution in a client/server computing environment, comprising:

means for automatically sending a request for an archive file from a client workstation to a first server over a first network connection, responsive to encountering a reference to said archive file during execution of code on said client workstation, and wherein said request identifies a dynamic archive builder accessible from said first server;

means for dynamically building said requested archive file by said dynamic archive builder, wherein said dynamically built archive file contains a proxy for a remotely-located component, said proxy having an interface which is identical to that of said remotely-located component;

means for returning said dynamically built archive file to said client workstation over said first network connection; and means for transparently accessing said remotely-located component during execution of a program contained in said returned archive file at said client workstation, as if said remotely-located component was being executed locally at said client workstation, by accessing said interface of said proxy.

9. The system according to claim 8, wherein said means for dynamically building further comprises means for programmatically generating said proxy.

10. The system according to claim 9, wherein said means for programmatically generating further comprises:

means for instantiating an instance of said remotely-located component;

means for determining a set of input methods used to set input properties of said instance;

means for determining a set of output methods used to get output properties of said instance;

means for determining one or more execution methods used to execute said instance;

means for generating said interface to have said input methods, said output methods, and said one or more execution methods; and means for generating source code of said proxy to perform a different version of each of said one or more execution methods, wherein each of said different versions causes invocation of a corresponding one of said one or more execution methods of said remotely-located component.

11. The system according to claim 8, wherein said means for transparently accessing further comprises:
   means for sending a set of parameter name/value pairs which are required by said remotely-located component from said proxy to a generic client application executing on said client workstation;
   means for forwarding said set of parameter name/value pairs from said generic client application to a generic server application over a second network connection, wherein said generic server application is executing on a second server and wherein said first network connection and said second network connection may or may not be different and said first server and said second server may or may not be different;
   means for invoking said remotely-located component by said generic server application, using said forwarded parameter name/value pairs; and
   means for returning results of said invocation to said program.

12. The system according to claim 11, wherein means for returning results further comprises:
   means for sending said results from said generic server application to said generic client application over said second network connection;
   means for forwarding said sent results from said generic client application to said proxy;
   means for using said input methods and said output methods of said generated interface to reflect said results; and
   means for obtaining said results by said program through use of said output methods.

13. The system according to claim 11, wherein said means for invoking further comprises:
   means for instantiating an instance of a particular remotely-located component specified by one of said parameter name/value pairs;
   means for determining a particular input method used to set a particular input property of said instance, and for invoking said determined particular input method to set an input property of said instance to an input value, wherein said particular input method and said input value are specified by another one of said parameter name/value pairs;
   means for invoking a particular execution method of said instance, wherein said particular execution method is specified by yet another one of said parameter name/value pairs, and wherein said invocation yields an execution result;
   means for determining one or more output methods used to get each output property of said instance, and for invoking each of said determined output methods to get said output properties of said instance as output values; and
   means for formatting said output properties and said output values as output parameter name/value pairs, thereby creating said results of said invocation.

14. The system according to claim 8, wherein said remotely-located component is a Java bean.

15. A method for automatically and transparently transforming software components into software components capable of execution in a client/server computing environment, comprising the steps of:
   automatically sending a request for an archive file from a client workstation to a first server over a first network connection, responsive to encountering a reference to said archive file during execution of code on said client workstation, and wherein said request identifies a dynamic archive builder accessible from said first server;
   dynamically building said requested archive file by said dynamic archive builder, wherein said dynamically built archive file contains a proxy for a remotely-located component, said proxy having an interface which is identical to that of said remotely-located component;
   returning said dynamically built archive file to said client workstation over said first network connection; and
   transparently accessing said remotely-located component during execution of a program contained in said returned archive file at said client workstation, as if said remotely-located component was being executed locally at said client workstation, by accessing said interface of said proxy.

16. The method according to claim 15, wherein said dynamically building step further comprises the step of programmatically generating said proxy.

17. The method according to claim 16, wherein said programmatically generating step further comprises the steps of:
   instantiating an instance of said remotely-located component;
   determining a set of input methods used to set input properties of said instance;
   determining a set of output methods used to get output properties of said instance;
   determining one or more execution methods used to execute said instance;
   generating said interface to have said input methods, said output methods, and said one or more execution methods; and
   generating source code of said proxy to perform a different version of each of said one or more execution methods, wherein each of said different versions causes invocation of a corresponding one of said one or more execution methods of said remotely-located component.

18. The method according to claim 15, wherein said transparently accessing step further comprises the steps of:
   sending a set of parameter name/value pairs which are required by said remotely-located component from said proxy to a generic client application executing on said client workstation;
   forwarding said set of parameter name/value pairs from said generic client application to a generic server application over a second network connection, wherein said generic server application is executing on a second server and wherein said first network connection and said second network connection may or may not be different and said first server and said second server may or may not be different;
   invoking said remotely-located component by said generic server application, using said forwarded parameter name/value pairs; and
   returning results of said invocation to said program.

19. The method according to claim 18, wherein returning results step further comprises the steps of:
   sending said results from said generic server application to said generic client application over said second network connection;
   forwarding said sent results from said generic client application to said proxy;

using said input methods and said output methods of said generated interface to reflect said results; and obtaining said results by said program through use of said output methods.

20. The method according to claim 18, wherein said invoking step further comprises the steps of:

instantiating an instance of a particular remotely-located component specified by one of said parameter name/value pairs;

determining a particular input method used to set a particular input property of said instance, and invoking said determined particular input method to set an input property of said instance to an input value, wherein said particular input method and said input value are specified by another one of said parameter name/value pairs;

invoking a particular execution method of said instance, wherein said particular execution method is specified by yet another one of said parameter name/value pairs, and wherein said invocation yields an execution result;

determining one or more output methods used to get each output property of said instance, and for invoking each of said determined output methods to get said output properties of said instance as output values; and formatting said output properties and said output values as output parameter name/value pairs, thereby creating said results of said invocation.

21. The method according to claim 15, wherein said remotely-located component is a Java bean.

* * * * *